(12) United States Patent
Yamana

(10) Patent No.: US 9,436,464 B2
(45) Date of Patent: Sep. 6, 2016

(54) INSTRUCTION-ISSUANCE CONTROLLING DEVICE AND INSTRUCTION-ISSUANCE CONTROLLING METHOD

(71) Applicant: Socionext Inc., Kanagawa (JP)

(72) Inventor: Tomohiro Yamana, Kyoto (JP)

(73) Assignee: SOCIONECT INC., Kanagawa (JP)

( * ) Notice: Subject to any disclaimer, the term of this patent is extended or adjusted under 35 U.S.C. 154(b) by 947 days.

(21) Appl. No.: 13/692,141

(22) Filed: Dec. 3, 2012

(65) Prior Publication Data

US 2013/0097409 A1      Apr. 18, 2013

Related U.S. Application Data

(63) Continuation of application No. PCT/JP2011/000432, filed on Jan. 27, 2011.

(30) Foreign Application Priority Data

Jun. 11, 2010   (JP) ................................. 2010-134528

(51) Int. Cl.
*G06F 9/30* (2006.01)
*G06F 15/00* (2006.01)
*G06F 9/38* (2006.01)

(52) U.S. Cl.
CPC .............. *G06F 9/30* (2013.01); *G06F 9/3802* (2013.01); *G06F 9/3851* (2013.01); *G06F 9/3853* (2013.01)

(58) Field of Classification Search
None
See application file for complete search history.

(56) References Cited

U.S. PATENT DOCUMENTS

| | | | |
|---|---|---|---|
| 5,546,593 A | 8/1996 | Kimura et al. | |
| 5,867,725 A * | 2/1999 | Fung et al. | ...................... 712/23 |
| 5,913,049 A * | 6/1999 | Shiell et al. | ................... 712/215 |
| 5,985,042 A * | 11/1999 | Fiedler | ............................... 134/6 |
| 6,105,127 A | 8/2000 | Kimura et al. | |
| 6,477,562 B2 | 11/2002 | Nemirovsky et al. | |
| 6,889,319 B1 | 5/2005 | Rodgers et al. | |
| 7,366,879 B2 | 4/2008 | Rodgers et al. | |
| 7,610,473 B2 | 10/2009 | Kissell | |

(Continued)

FOREIGN PATENT DOCUMENTS

| | | |
|---|---|---|
| JP | 6-44089 | 2/1994 |
| JP | 6-332700 | 12/1994 |

(Continued)

OTHER PUBLICATIONS

International Search Report issued Apr. 26, 2011 in corresponding International Application No. PCT/JP2011/000432.

(Continued)

*Primary Examiner* — Corey S Faherty
(74) *Attorney, Agent, or Firm* — Wenderoth, Lind & Ponack, L.L.P.

(57) ABSTRACT

In a multithread processor capable of executing a plurality of threads, in order to select a thread and instruction for increasing a throughput of the multithread processor, an instruction-issuance controlling device included in the multithread processor includes a resource management unit configured to manage stall information indicating whether or not each of threads in execution is in a stalled state; a thread selection unit configured to select a thread which is not in the stalled state among the threads in execution; and an instruction-issuance controlling unit configured to perform controlling so that simultaneously issuable instructions are issued from among the selected thread.

16 Claims, 12 Drawing Sheets

(56) References Cited

U.S. PATENT DOCUMENTS

| | | |
|---|---|---|
| 8,141,088 B2 | 3/2012 | Morishita et al. |
| 8,145,884 B2 | 3/2012 | Kissell |
| 2002/0062435 A1 | 5/2002 | Nemirovsky et al. |
| 2005/0038980 A1 | 2/2005 | Rodgers et al. |
| 2005/0120194 A1 | 6/2005 | Kissell |
| 2008/0109809 A1 | 5/2008 | Morishita et al. |
| 2009/0113179 A1 | 4/2009 | Kakeda et al. |
| 2010/0115243 A1 | 5/2010 | Kissell |

FOREIGN PATENT DOCUMENTS

| | | |
|---|---|---|
| JP | 10-124316 | 5/1998 |
| JP | 2001-084143 | 3/2001 |
| JP | 2003-516570 | 5/2003 |
| JP | 3877527 | 2/2007 |
| JP | 2007-504535 | 3/2007 |
| JP | 2008-123045 | 5/2008 |
| JP | 2009-110209 | 5/2009 |
| WO | 00/36487 | 6/2000 |
| WO | 01/41530 | 6/2001 |
| WO | 2005/022384 | 3/2005 |
| WO | 2006/129767 | 12/2006 |

OTHER PUBLICATIONS

F.N. Eskesen et al., "Performance Analysis of Simultaneous Multithreading in a PowerPC-based Processor", WDDD 2002, The Annual Workshop on Duplicating, Deconstructing, and Debunking held in conjunction with the International Symposium on Computer Architecture (ISCA), Jun. 2002.

* cited by examiner

INSTRUCTION-ISSUANCE CONTROLLING DEVICE AND INSTRUCTION-ISSUANCE CONTROLLING METHOD

CROSS REFERENCE TO RELATED APPLICATION

This is a continuation application of PCT International Application No. PCT/JP2011/000432 filed on Jan. 27, 2011, designating the United States of America, which is based on and claims priority of Japanese Patent Application No. 2010-134528 filed on Jun. 11, 2010. The entire disclosures of the above-identified applications, including the specifications, drawings and claims are incorporated herein by reference in their entirety.

FIELD

The present invention relates to a processor architecture capable of executing a plurality of threads.

BACKGROUND

When a single thread is executed, various factors (an instruction cache miss, a data cache miss, an inter-instructions penalty, or the like) cause a processor to be fallen in a stalled state.

A cycle in which the processor is in a stalled state decreases execution efficiency (i.e., a throughput) of the processor during its execution of the single thread.

In view of the above, a multi-thread processor having an architecture capable of simultaneously executing a plurality of threads are proposed for improving the execution efficiency of the processor.

As the multi-thread processor capable of simultaneously executing the threads, a method has been known which executes threads with switching the threads to be executed at predetermined time intervals, using a round robin scheduling, for example.

In this case, a time period required for processing of each of the threads is longer than that for a case where a single thread is executed. However, even if a certain thread is in the stalled state, another thread is executed after a predetermined time period elapses. Therefore, a whole throughput is improved in comparison with the case where a single thread is to be executed, thereby improving the execution efficiency of the processor.

However, upon switching among the threads, if the threads are simply switched at predetermined time intervals, it is difficult to estimate a processing time period up to completion of the processing. For this reason, practicality is low in a field which requires real time. In addition, since an execution order of the threads is not optimal, the execution efficiency of the processor is low.

In view of the above, in order to perform the switching in threads for improving the estimation of the processing time period and the execution efficiency, techniques disclosed in Patent Literatures 1 and 2 have been proposed.

Patent Literature 1 discloses a thread scheduler, referring to diagrams which show an overall configuration in detail. With this configuration, a priority in threads is considered, and a thread can be selected so that the execution efficiency in the thread having a higher priority increases.

Patent Literature 2 discloses a technique in which instruction-issuance groups in a thread are counted, and the number of cycles necessary for processing the thread is calculated, so as to efficiently switch a plurality of threads, taking the priority in the threads into account.

Description is given more specifically, with reference to FIG. 12.

FIG. 12 is a diagram which shows an overall configuration of a multithread processor including a conventional instruction-issuance controlling device.

In the overall configuration diagram, a multithread processor capable of simultaneously executing N threads is assumed. However, the number of threads which can be executed is not essentially limited.

As shown in FIG. 12, the multithread processor including a conventional instruction-issuance controlling device includes an instruction cache memory 101, an instruction fetch unit 102, an instruction buffer 103, an instruction-issuance controlling device 104, an instruction execution unit 107, a data cache memory 108, and a register file 109.

The instruction cache memory 101 supplies an instruction to the instruction buffer 103, in response to a request from the instruction fetch unit 102. If the requested instruction is not cached, an instruction is obtained from a main memory (not shown) outside the multithread processor.

The instruction fetch unit 102 fetches the instruction from the instruction cache memory 101 to the instruction buffer 103, in response to a request from the instruction buffer 103.

N instruction buffers 103 are prepared, and each of which corresponds to a corresponding one of threads. Each of the instruction buffers 103 stores an instruction stream to be executed by each of the threads.

The instruction-issuance controlling device 104 sends a control signal to the instruction buffer 103, and the instruction execution unit 107 issues an instruction to be next executed as an instruction group.

The instruction execution unit 107 is a processing unit including a plurality of calculating units, such as an adder and a multiplier, and executes the instruction group issued from the instruction buffer 103.

The data cache memory 108 supplies data necessary for the calculation to the instruction execution unit 107, in response to the request from the instruction execution unit 107. If the data cache memory 108 does not store the requested data, the data cache memory 108 obtains the requested data from the main memory (not shown) outside the multithread processor, and then supplies the obtained data to the instruction execution unit 107.

N register files 109 are prepared, and each of which corresponds to a corresponding one of the threads and to a register access which relates to instruction execution of each of the threads. The register files 109 are a group of registers each of which holds data to be readout and written in by executing each of threads stored in the instruction buffer 103.

The instruction-issuance controlling device 104 includes an instruction grouping unit 105 and a thread selection unit 106.

The instruction grouping unit 105 groups, as an instruction group, one or more instructions which can be simultaneously executed, according to dependency in the instruction buffer 103, among instructions in the instruction buffer 103 which correspond to the respective threads selected by the thread selection unit 106.

In other words, instructions which can be issued in a single cycle are grouped as one group.

The thread selection unit 106 determines a thread to be executed next from among N threads, based on the priority which is previously determined or dynamically varies.

In other words, the conventional instruction-issuance controlling device 104 shown in FIG. 12 determines the thread to be executed based on the priority which is previously determined by the thread selection unit 106 or dynamically varies. In addition, the conventional instruction-issuance controlling device 104 groups, in an issuable group, instruction streams stored in the instruction buffer 103 and corresponding to the respective threads to be executed, and issues the group to the instruction execution unit 107.

CITATION LIST

Patent Literature

[PTL 1] International application publication No. 2006/129767
[PTL 2] Japanese unexamined application publication No. 2008-123045

SUMMARY

Technical Problem

However, a conventional thread switching method cannot sufficiently suppress decreasing of a throughput in a multithread processor due to occurrence of a stalled state in a thread.

Description is given in detail with reference to FIG. 11.

FIG. 11 is a diagram which shows execution timings and stalled timings of instructions each allocated to a respective thread A801, thread B802, and thread C803.

Each of the thread A801, thread B802, and thread C803 previously includes therein a zone in which a stalled cycle occurs, as shown in FIG. 11.

A time chart 804, a time chart 805, and a time chart 806 show the respective results of the execution of these threads.

The time chart 804 shows the execution timing and the stalled timing of an instruction in the thread A801.

The time chart 805 shows the execution timing and the stalled timing of an instruction in the thread B802.

The time chart 806 shows the execution timing and the stalled timing of an instruction in the thread C803.

As indicated in time charts 804 to 806 in FIG. 11, a cycle 821 is allocated to the thread A801, a cycle 822 is then allocated to the thread B802, and a cycle 823 is finally allocated to the thread C803.

Subsequently, a cycle 824 is allocated to the thread A801, a cycle 825 is then allocated to the thread B802, and a cycle 826 is finally allocated to the thread C803.

Although each of six cycles 831 to 836 is allocated to the respective threads, the threads cannot be executed due to the stalled states of the respective threads.

In FIG. 11, these six cycles 831 to 836 waste.

Patent Literature 1 refers to switching in threads in view of a time period required for the stalled state due to a cache miss, a branch prediction miss, or the like. However, Patent Literature 1 does not disclose a control line or a specific algorithm necessary for achieving the switching in threads. Patent Literature 1 does also not refer to the switching in threads, in view of an inter-instructions penalty which occurs in instructions having dependency with each other.

Patent Literature 2 does not refer to a specific control method, though it discloses that a thread is controlled, in view of the inter-instructions penalty.

Accordingly, none of the aforementioned publications proposes a specific technique for increasing the throughput of the multithread processor, which decreases due to stalled states in a thread caused by various factors (the instruction/data cache miss, and the inter-instructions penalty) upon the execution of the instruction.

For solving the above problems, an object of the present invention is to provide an instruction-issuance controlling device capable of suppressing the decreasing of the throughput in the multithread processor due to occurrence of a stalled state in a thread, and a multithread processor including the instruction-issuance controlling device.

Solution to Problem

In order to solve the above problems in a conventional technique, an instruction-issuance controlling device according to an aspect of the present invention includes a resource management unit configured to manage stall information indicating whether or not each of threads in execution is in a stalled state; a thread selection unit configured to select a thread which is not in the stalled state among the threads in execution; and an instruction-issuance controlling unit configured to control the multithread processor so that simultaneously issuable instructions are issued from the selected thread.

With this configuration, the resource management unit included in the instruction-issuance controlling device can manage, for each of the threads in execution, whether or not the thread is in the stalled state and how many cycles are necessary for the completion of the stalled state when the thread is in the stalled state. The instruction-issuance controlling device issues an instruction from an instruction buffer so that the thread which is in the stalled state is not executed, referring to the managed information. As a result, the instruction-issuance controlling device can be achieved which can sufficiently suppress decreasing of a throughput in the multithread processor, caused by occurrence of a stalled thread.

To be specific, the resource management unit may be configured to, for each of the threads in execution, (i) manage the number of stalled cycles which indicates the number of remaining cycles for the stalled state to determine whether or not the number of the stalled cycles is one or more, (ii) determine that the thread is not in the stalled state and update the stall information if the number of the stalled cycles is 0.

A multithread processor according to an aspect of the present invention may include: an instruction execution unit; and an instruction-issuance controlling device, in which the instruction-issuance controlling device may include: a resource management unit configured to manage stall information indicating whether or not each of threads in execution is in a stalled state; a thread selection unit configured to select a thread which is not in the stalled state among the threads in execution; and an instruction-issuance controlling unit configured to perform controlling so that simultaneously issuable instructions are issued from the selected thread to the instruction execution unit.

With this configuration, the resource management unit included in the instruction-issuance controlling device can manage, for each of the threads in execution, whether or not the thread is in the stalled state and how many cycles are necessary for the completion of the stalled state when the thread is in the stalled state. The instruction-issuance controlling device issues an instruction so that the thread which is in the stalled state is not executed, referring to the managed information. As a result, the multithread processor can be achieved the decreasing of the throughput caused by the occurrence of the stalled thread is sufficiently suppressed.

To be specific, the resource management unit may be configured to, for each of the threads in execution, (i) manage the number of stalled cycles which indicates the number of remaining cycles for the stalled state to determine whether or not the number of the stalled cycles is one or more, (ii) determine that the thread is not in the stalled state and update the stall information if the number of the stalled cycles is not one or more (in other words, the number of the stalled cycles is 0).

To be more specific, the resource management unit may include: a first flag holding unit configured to hold a thread ready flag as the stall information; and a first counter for managing the number of the stalled cycles, and the resource management unit may be configured to (i) set the thread ready flag to 0, if the first counter indicates 1 or more, and (ii) set the thread ready flag to 1, if the first counter indicates 0.

The multithread processor may further include a plurality of instruction buffers, each of which stores instructions in each of the threads, in which the instruction-issuance controlling unit may include an instruction grouping unit configured to group, as an instruction group, one or more simultaneously issuable instructions to be subsequently issued to the instruction execution unit, among the instructions stored in the instruction buffers, and the instruction grouping unit may be configured to perform the grouping so as to preferentially include, in the instruction group, an instruction which has no dependency with each of the instructions currently executed by the instruction execution unit, among the instructions stored in the instruction buffers.

With this configuration, it can be avoided that the instruction having dependency with the instruction in execution is executed and the thread falls in the stalled state. As a result, the multithread processor having an enhanced execution efficiency can be achieved.

To be specific, the resource management unit may include: a second flag holding unit configured to hold resource ready flags each of which is associated with a corresponding one of shared resources and indicates whether or not the corresponding one of the shared resources is currently occupied by one of the threads in execution; and second counters, each of which indicates the number of remaining cycles for the occupation of a shared resource included in the shared resources, by one of the thread in execution, and the instruction grouping unit may be configured to perform the grouping so as not to include, in the instruction group, an instruction using the shared resource currently occupied, among the instructions stored in the instruction buffers.

The instruction grouping unit may be configured to notify the resource management unit of identification information in relation to the currently-occupied shared resource and identification information in relation to the thread which occupies the shared resource, and the resource management unit may be configured to update a first counter for the thread corresponding to the identification information as notified, according to the second counter corresponding to the shared resource as notified.

When each of the instructions stored in the instruction buffers has the dependency with one of the instructions which are being executed by the instruction execution unit, the instruction grouping unit may be configured to notify the resource management unit of identification information in relation to the thread in execution to which the instruction stored in the instruction buffers belongs, and the number of remaining execution cycles for completion of the instruction which is being in execution; and the resource management unit may be configured to update a first counter for managing the number of the stalled cycles of the thread corresponding to the identification information, according to the number of the remaining execution cycles as notified.

The multithread processor may further includes a data cache memory which holds data to be used by the instruction execution unit, in which when a data cache miss occurs, the instruction execution unit may be configured to notify the resource management unit of identification information in relation to the thread in execution and the number of cycles required for forwarding data in which the data cache miss has occurred, from a main memory outside the multithread processor to the data cache memory, and the resource management unit may be configured to update a first counter for managing the number of the stalled cycles of the thread corresponding to the identification information, according to the number of the cycles as notified.

The multithread processor may further include: an instruction cache memory; and an instruction fetch unit configured to fetch an instruction from the instruction cache memory, and supply the fetched instruction to each of the instruction buffers, in which when an instruction cache miss occurs upon the fetch of the instruction, the instruction fetch unit may be configured to notify the resource management unit of identification information in relation to the thread in execution and the number of cycles required for forwarding an instruction in which the instruction cache miss occurs, from a main memory outside the multithread processor to the instruction cache memory, and the resource management unit may be configured to update a first counter managing the number of the stalled cycles of the thread corresponding to the identification information, according to the number of the cycles as notified.

Upon execution of a branch instruction, the instruction execution unit may be configured to notify the resource management unit of the number of remaining cycles required for fixation of a branch destination address of the branch instruction, and the identification information in relation to the thread to which the branch instruction belongs, and the resource management unit may be configured to update a first counter for managing the number of the stalled cycles of the thread corresponding to the identification information, according to the number of the cycles as notified.

With this configuration, the stalled cycle occurring along with the execution of the branch instruction is managed by the resource management unit, so that the thread to be stalled is not selected as an execution thread, thereby achieving a multithread processor having the enhanced execution efficiency.

The multithread processor may further include a data cache memory and a bus control unit connected to the instruction cache memory, the data cache memory, and a main memory outside the multithread processor, in which when a cache miss occurs in the instruction cache memory and the data cache memory, and the bus control unit is occupied, the bus control unit may be configured to notify the resource management unit of the number of remaining occupation cycles which indicates the number of remaining cycles required for current occupation; and the resource management unit may be configured to update a first counter, according to the number of the remaining occupation cycles as notified.

With this configuration, the resource management unit can manage a time period required for occupation of the bus control unit by other components, such as digital signal processor (DSP) or the like connected to a single bus control unit. As a result, the number of the stalled cycles is managed more precisely, thereby increasing the throughput of the multithread processor.

The resource management unit may be configured to, for each of the threads in execution, overwrite a value indicated by a first counter with the number of the stalled cycles as notified, only when notified of the number of the stalled cycles larger than the value indicated by the first counter.

The resource management unit may be configured to subtract a previously-specified value from a value indicated by a first counter for managing the number of the stalled cycles or the second counter every cycle of operation of the multithread processor.

The instruction-issuance controlling unit included in a multithread processor according to another aspect of the present invention may further include a branch predictor configured to (i) predict a branch destination address before the instruction execution unit completes execution of a branch instruction; (ii) execute the branch instruction using the predicted branch destination address; and (iii) notify the resource management unit of the number of the stalled cycles which have a possibility of occurring due to incorrectness of the prediction for the branch destination address, and the resource management unit may be configured to add the number of the stalled cycles to a value indicated by the first counter, when notified by the branch predictor.

With this configuration, the stalled cycles caused by the penalty for a branch-prediction miss due to incorrectness of the branch prediction by the branch predictor can be managed by the resource management unit, so that the stalled cycles caused by the branch-prediction miss can be hidden.

A multithread processor according to still another aspect of the present invention is a simultaneous multithreading (SMT) multithread processor by which a plurality of instruction groups are simultaneously issued to an instruction execution unit, the SMT multithread processor includes: an instruction-issuance controlling device including: a resource management unit configured to manage stall information indicating whether or not each of threads in execution is in a stalled state; a thread selection unit configured to select threads which are not in the stalled state from among the threads in execution; and an instruction grouping unit configured to perform controlling so that a plurality of instruction groups, each of which belongs to a corresponding one of the selected threads, are simultaneously issued to the instruction execution unit.

With this configuration, in the SMT multithread processor, the thread including a stalled cycle can be removed from an execution target by managing the stalled cycles, thereby increasing the throughput of the multithread processor.

It should be noted that the present invention can be achieved not only as the aforementioned instruction-issuance controlling device and the multithread processor, but also as an instruction-issuance controlling method including, as steps, distinguishing unit included in the instruction-issuance controlling device and the multithread processor.

Advantageous Effects

As described above, the present invention can provide an instruction issuance-controlling device capable of suppressing the decreasing of a throughput in a multithread processor caused by occurrence of a stalled thread, and a multithread processor including the instruction-issuance controlling device.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Embodiment 1

Hereinafter, an instruction-issuance controlling device and a multithread processor which includes the instruction-issuance controlling device, according to Embodiment 1 of the present invention, are described, referring to drawings.

Figure 1:
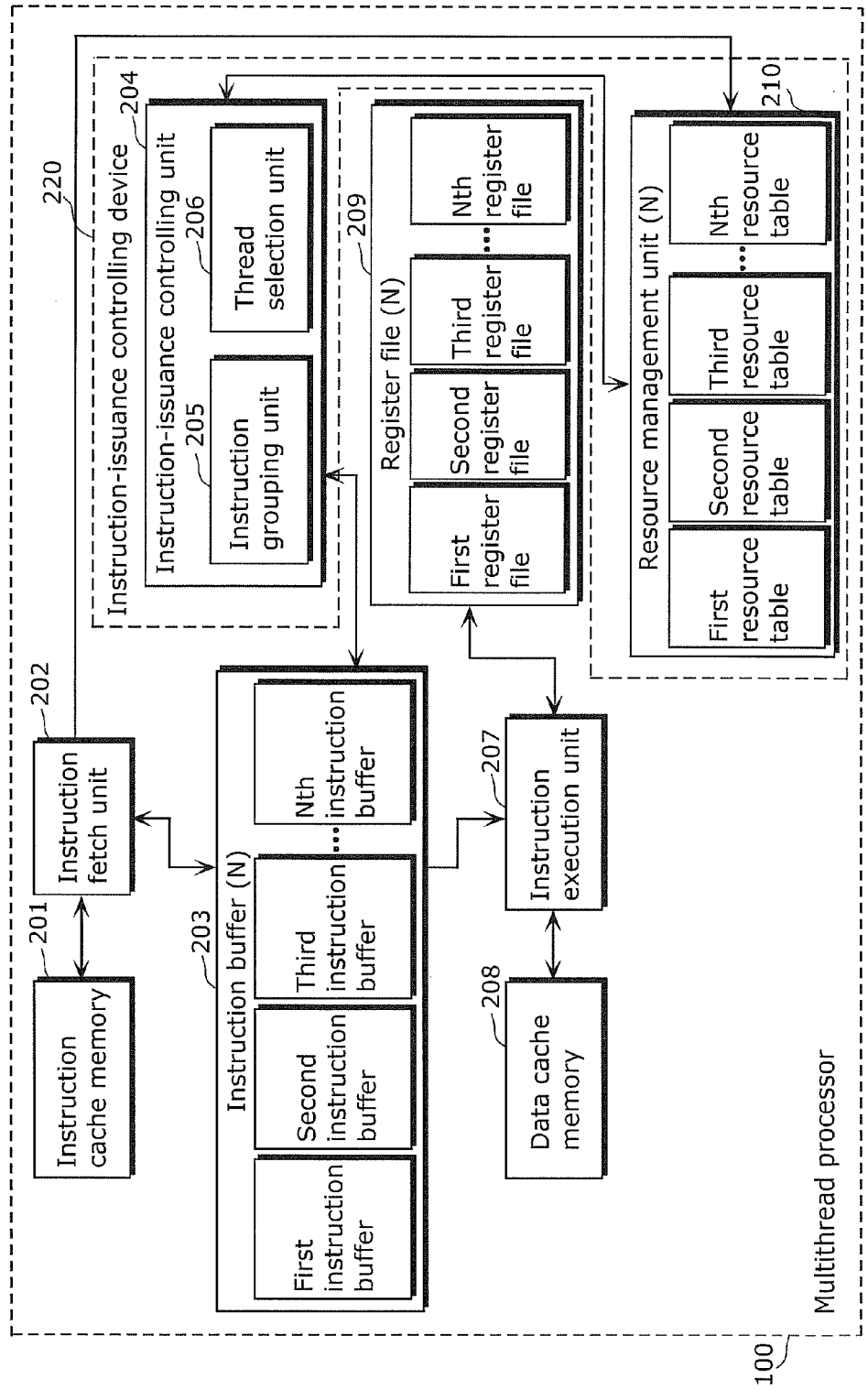
FIG. 1 is a diagram which shows an overall configuration of a multithread processor including an instruction issuance controlling device, according to Embodiment 1 of the present invention.

FIG. 1 is a diagram which shows an overall configuration of a multithread processor 100 including an instruction-issuance controlling device according to Embodiment 1 of the present invention.

The multithread processor 100 according to Embodiment 1 is mainly different from a conventional technique in points that a resource management unit 210 is added, and processing in a thread selection unit 206 and an instruction grouping unit 205 is modified along with the addition of the resource management unit 210.

As shown in FIG. 1, the multithread processor 100 includes an instruction cache memory 201, an instruction fetch unit 202, an instruction buffer 203, an instruction-issuance controlling device 220, an instruction execution unit 207, a data cache memory 208, and a register file 209.

The instruction cache memory 201 supplies an instruction to the instruction buffer 203, in response to a request from the instruction fetch unit 202. If the requested instruction is not cached, an instruction is obtained from a main memory 904 (see FIG. 8 described later) outside the multithread processor.

The instruction fetch unit 202 fetches the instruction from the instruction cache memory 201 to the instruction buffer 203, in accordance with the request from the instruction buffer 203.

N instruction buffers 203 are prepared, and each of which corresponds to a corresponding one of threads. Each of the instruction buffers 203 stores an instruction stream to be executed by each of the threads.

For example, if the multithread processor 100 can execute N threads, N instruction buffers in total exist from a first instruction buffer to the Nth instruction buffer. Here, N instruction buffers are correctively referred to as the instruction buffer 203, as a general rule.

The instruction-issuance controlling device 220 sends a control signal to the instruction buffer 203, and controls the instruction buffer 203 to issue one or more simultaneously issuable instructions to be next executed by the instruction execution unit 207.

The instruction execution unit 207 is a processing unit including a plurality of calculating units, such as an adder and a multiplier, and executes an instruction group including one or more simultaneously issuable instructions which are issued from the instruction buffer 203.

The data cache memory 208 supplies data necessary for the calculation to the instruction execution unit 207, in response to a request from the instruction execution unit 207.

If the data cache memory 208 does not store the requested data, the data cache memory 208 obtains the requested data from the main memory 904 (see in FIG. 8 described later) outside the multithread processor 100, and then supplies the obtained data to the instruction execution unit 207.

N register files 209 are prepared, and each of which corresponds to a corresponding one of threads, and corresponds to a register access for the instruction execution of each of threads. In other words, the register file 209 is a register group which holds data to be readout and written in by executing each of the threads stored in the instruction buffer 203. Here, N register files are collectively referred to as the register file 209 as a general rule.

The instruction-issuance controlling device 220 includes an instruction-issuance controlling unit 204 and a resource management unit 210.

The instruction issuance controlling unit 204 controls the multithread processor so that simultaneously issuable instructions are issued from the selected thread. Specifically, the instruction-issuance controlling unit 204 includes an instruction grouping unit 205 and a thread selection unit 206.

The instruction grouping unit 205 groups, as the instruction group, one or more simultaneously issuable instructions which are to be next issued to the instruction execution unit 207 from among instruction streams in the instruction buffer 203, each of which corresponds to the thread selected by the thread selection unit 206, based on information from the resource management unit 210 and the dependency in the instruction buffer 203.

The thread selection unit 206 determines a thread which is to be next executed, using a priority which is previously determined or dynamically varies, and the information from the resource management unit 210.

The resource management unit 210 manages a resource table. The resource table corresponds to each of the threads which can be executed by the multithread processor 100. If the multithread processor 100 can execute N threads, for example, N resource tables exist from the first resource table to the Nth resource table.

The resource management unit 210 receives information from the instruction execution unit 207, the instruction buffer 203, and the instruction fetch unit 202, and manages, using the respective resource tables, (i) whether or not each of the threads occupies a shared resource, (ii) if the shared resource is occupied, how many cycles remain until the shared resource is released, (iii) whether or not the thread is in a stalled state, and (iv) if the thread is in the stalled state, how many stalled cycles remain until the stalled state terminates.

The instruction-issuance controlling device 220 included in the multithread processor 100 includes the resource management unit 210 which manages stall information indicating whether not each of the threads in execution is in the stalled state, the thread selection unit 206 which selects a thread which is not in the stalled state from among the threads in execution, the instruction-issuance controlling unit 204 which controls the multithread processor 100 so that the simultaneously issuable instructions are issued from the selected thread.

Here, the thread in execution is a thread which has already been read by the instruction buffer 203. In Embodiment 1, N instruction buffers exist from the first instruction buffer to the Nth instruction buffer, so that up to N threads can be in execution.

Specifically, the instruction-issuance controlling device 220 issues, from the instruction buffer 203 to the instruction execution unit 207, the simultaneously issuable instructions among a plurality of instructions belonging to the threads which are stored in the instruction buffer 203 and not in the stalled state.

The resource management unit 210 manages the number of the stalled cycle, which indicates how many cycles remain for the stalled state in relation to the threads in execution. The resource management unit 210 determines whether or not the number of the stalled cycles is one or more, and determines that the thread is in the stalled state if the number of the stall cycle is one or more to update the stall information in the corresponding resource table.

On the other hand, if the number of the stalled cycle is 0, the resource management unit 210 determines the thread is not in the stalled state, and updates the stall information in the corresponding resource table.

Specifically, the resource management unit 210 includes a first flag holding unit 304 which holds a thread ready flag as the stall information, and a first counter 303 which is a counter for managing the number of the stalled cycles.

The resource management unit 210 sets the thread ready flag to 0 if the first counter 303 indicates 1 or more, while the resource management unit 210 sets the thread ready flag to 1 if the first counter 303 indicates 0.

The multithread processor 100 includes the instruction buffer 203 including a plurality of buffers each of which stores instruction streams belonging to each of the threads, and the instruction-issuance controlling unit 204 includes the instruction grouping unit 205 which groups, as the instruction group, one or more simultaneously issuable instructions which are to be next issued to the instruction execution unit 207 among instructions stored in the instruction buffer 203.

The instruction grouping unit 205 performs grouping so as to preferentially include, in the instruction group, instructions which do not have dependency with any of the instructions currently executed by the instruction execution unit 207 among instructions stored in the instruction buffer 203 which includes a plurality of buffers.

The resource management unit 210 includes second flag holding units 306 each of which holds a resource ready flag indicating whether or not each of the threads in execution currently occupies any one of the shared resources, and a second counter 305 which indicates the number of remaining cycles for the occupation of the shared resource by each of the threads in execution.

Here, the instruction grouping unit 205 performs the grouping so as not include an instruction using any of the shared resources which is now occupied, in the instruction group to be issued to the instruction execution unit 207, among the instructions stored in the instruction buffer 203 including a plurality of buffers.

The instruction grouping unit 205 notifies the resource management unit 210 of identification information in relation to the shared resource which is now occupied and identification information in relation to the thread which occupies the shared resource. The resource management unit 210 updates the first counter 303 for the thread corresponding to the notified identification information, according to the second counter 305 which corresponds to the shared resource as notified.

If the instruction stored in the instruction buffer 203 has dependency with the instruction which is being executed by the instruction execution unit 207, the instruction grouping unit 205 notifies the resource management unit 210 of the identification information in relation to the thread in execution to which the instruction stored in the instruction buffer 203 belongs, and the number of the remaining cycles for completion of the execution of the executed instruction.

Then, the resource management unit 210 which receives the notification updates the first counter for the thread corresponding to the identification information as notified, according to the number of remaining execution cycles as notified.

If a data cache miss occurs, the instruction execution unit 207 notifies the resource management unit 210 of the identification information in relation to the thread in execution and the number of cycles necessary for forwarding data in which the data cache miss occurs from the main memory 904 outside the multithread processor 100 to the data cache memory 208.

Then, the resource management unit 210 updates the first counter 303 for the thread corresponding to the identification information as notified, according to the number of cycles as notified.

If an instruction cache miss occurs when an instruction is fetched, the instruction fetch unit 202 notifies the resource management unit 210 of the identification information in relation to the thread in execution and the number of cycles necessary for forwarding the instruction in which the instruction cache miss occurs, from the main memory 904 outside the multithread processor 100 to the instruction cache memory 201.

Then, the resource management unit 210 updates the first counter 303 for the thread corresponding to the identification information as notified, according to the number of cycles as notified.

Upon execution of a branch instruction, the instruction execution unit 207 notifies the resource management unit 210 of the number of cycles required until a branch destination address of the branch instruction is fixed and the identification information in relation to the thread to which the branch instruction belongs. Then, the resource management unit 210 updates the first counter 303 for the thread corresponding to the identification information as notified, according to the number of cycles as notified.

The resource management unit 210 updates, for each of the threads in execution, the first counter 303 by overwriting a value indicated by the first counter 303 with the notified number of the stalled cycles, only when notified of the number of stalled cycles, which is larger than the value indicated by the first counter 303.

The resource management unit 210 subtracts a previously determined specified value from values indicated by the first counter 303 and the second counter 305 every operation performed in one cycle by the multithread processor 100.

Hereinafter, more detailed description is given.

Figure 2:
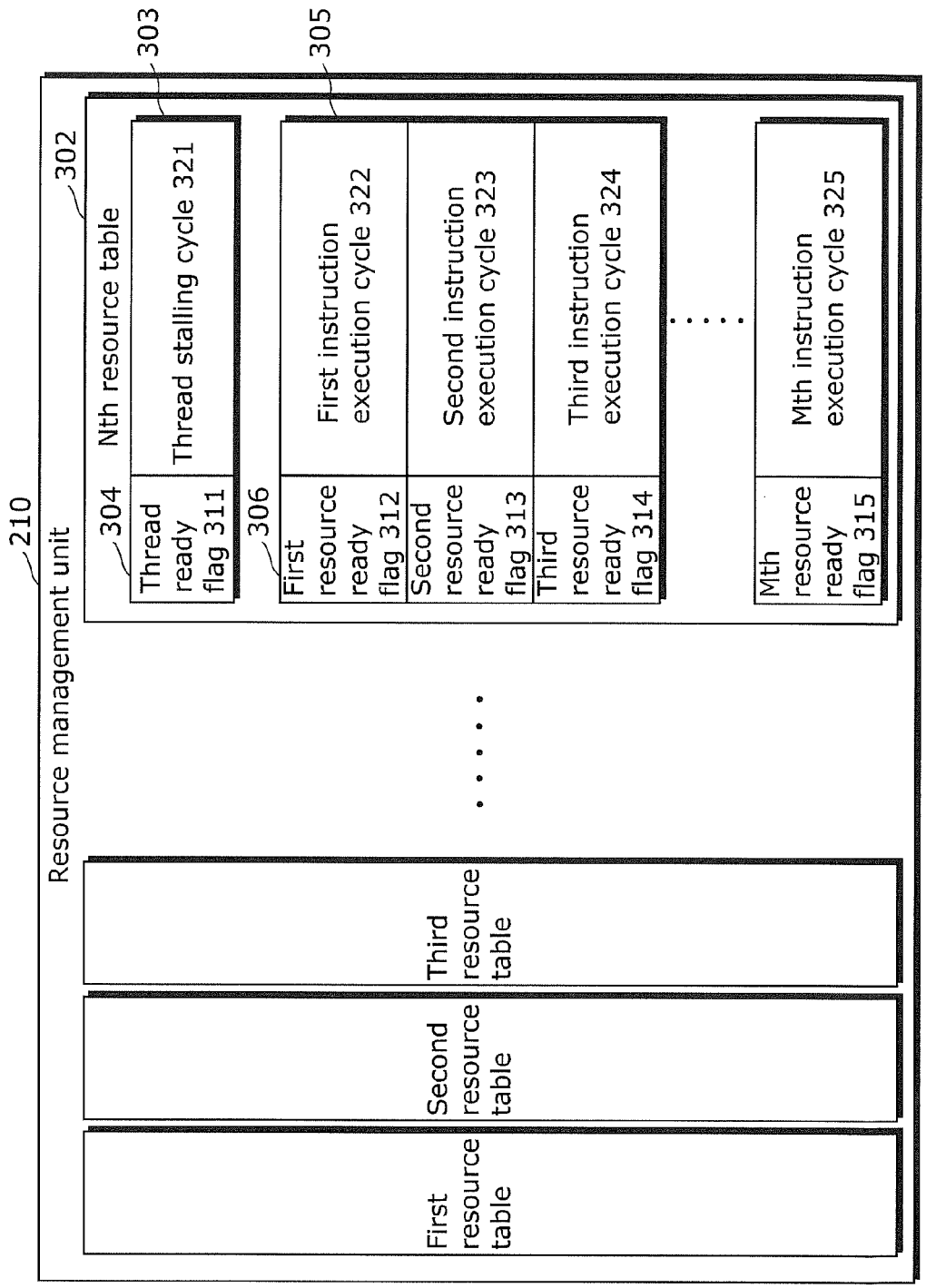
FIG. 2 is a diagram which shows details of a resource management table according to Embodiment 1 of the present invention.

FIG. 2 is a diagram which shows details of the resource management table according to Embodiment 1 of the present invention.

The resource management unit 210 includes N resource tables respectively corresponding to N threads (when the number of threads executed by the multithread processor 100 is set to N. It is also applied to any one of the following cases).

All resource tables have the same configuration. Accordingly, the description is given, with reference to the Nth resource table 302.

The Nth resource table 302 includes the first counter 303, the first flag holding unit 304, the second counter 305, and the second flag holding unit 306.

The first counter 303 is a counter which holds the number of the stalled cycles (hereinafter, which is also referred to as a thread stalling cycle 321), indicating the number of the cycles in which the thread is in the stalled state.

The first flag holding unit 304 holds a thread ready flag 311 which indicates that a thread is executable.

When the thread stalling cycle 321 is 1 or more, the thread ready flag 311 is 0, which means that the thread is inexecutable.

When the thread stalling cycle 321 is 0, the thread ready flag 311 is 1, which means that the thread is executable.

When data is written in the shared resource in accordance with the instruction for executing the data-writing in the shared resource, the second counter 305 holds, for each of the shared resources, a counter (hereinafter, which is also referred to as an instruction execution cycle) which indicates the number of the cycles required by the processor for completion of the execution of the writing instruction. In other words, the second counter 305 holds the number of cycles necessary for the processor up to the completion of the writing in the shared resource.

The second flag holding unit 306 holds a resource ready flag which indicates that the shared resource is available. The resource ready flag is 0 when the instruction execution cycle is 1 or more, which means that the shared resource is unavailable, while the resource ready flag is 1 when the instruction execution cycle is 0, which means that shared resource is available.

It should be noted that the resource ready flag and the instruction execution cycle are held as many as the shared resources. In Embodiment 1, the number of the resource ready flag and the number of the instruction execution cycle correspond to the number of the shared resources, which is indicated as M. The second flag holding unit 306 holds the first resource ready flag 312 to the Mth resource ready flag 315, while the second counter 305 holds the first instruction execution cycle 322 to the Mth instruction execution cycle 325.

The first counter 303, the first flag holding unit 304, the second counter 305, and the second flag holding unit 306 can be achieved by a register in the processor, for example.

Figure 3:
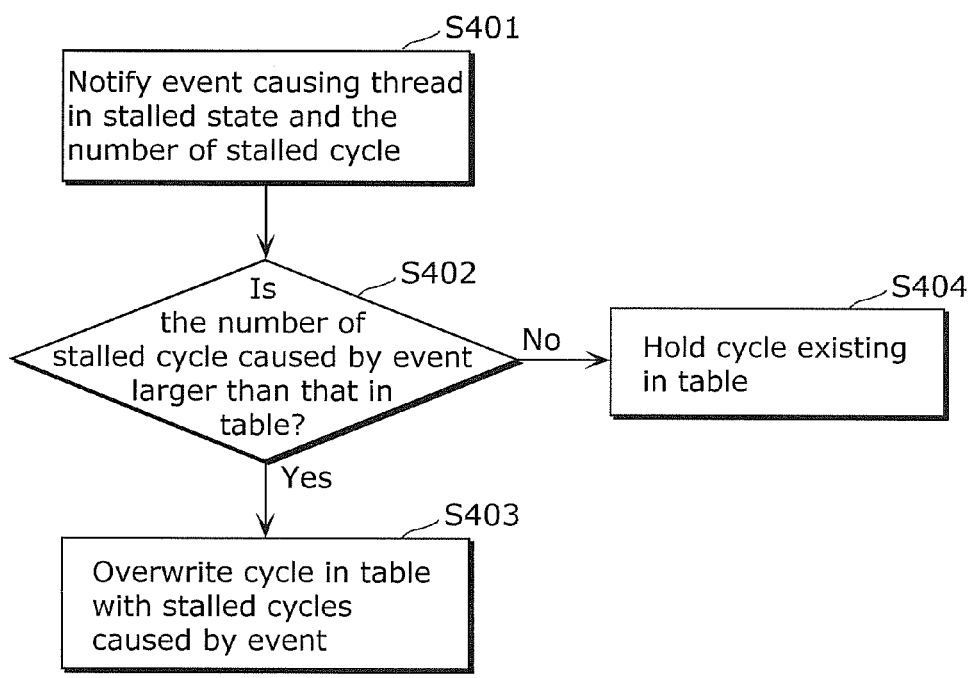
FIG. 3 is a flowchart which shows a flow of processing of rewriting algorithm in a first counter according to Embodiment 1 of the present invention.

FIG. 3 is a flowchart which shows a flow of processing in rewriting algorithm in the first counter 303 according to Embodiment 1 of the present invention.

As shown in the overall configuration diagram in FIG. 1, the resource management unit 210 receives a control signal from the instruction execution unit 207, the instruction fetch unit 202, and the instruction-issuance controlling unit 204, so as to acquire information in relation to an event which causes respective threads in which the data cache miss, the instruction cache miss, and an inter-instructions penalty occur, to be in the stalled state. The event information contains the number of stalled cycles unique to each of the events. This number of the stalled cycles is notified to the resource management unit 210 at the same time (Step S401).

When the respective events occur which cause the threads to be in the stalled state, such that the data cache miss occurs in the instruction execution unit 207, the instruction cache miss occurs in the instruction fetch unit 202, or the inter-instructions penalty occurs in the instruction-issuance controlling unit 204 (or the instruction grouping unit 205 included in the instruction-issuance controlling unit 204), the instruction execution unit 207, the instruction fetch unit 202, and the instruction grouping unit 205 notify the resource management unit 210 of the identification information in relation to the respective threads in which the events occur and numbers of the stalled cycles caused by the events.

The resource management unit 210 compares the respective numbers, as notified, of the stalled cycles caused by the events with the thread stalling cycle 321 already stored in the first counter 303 (Step S402). If the number of the stalled cycles caused by the event, as newly notified, is larger than the thread stalling cycle 321, the resource management unit 210 overwrites the thread stalling cycle 321 already stored in the first counter 303 with the number of the cycles required for the events as newly notified (Step S403).

If the number, as newly notified, of the stalled cycles caused by the event is smaller than the thread stalling cycle 321, the resource management unit 210 keeps the thread stalling cycle 321 already stored in the first counter 303 without adding any change (Step S404).

The resource management unit 210 manages the thread stalling cycle 321 which corresponds to each of the threads, using such algorithm as described above.

Figure 4:
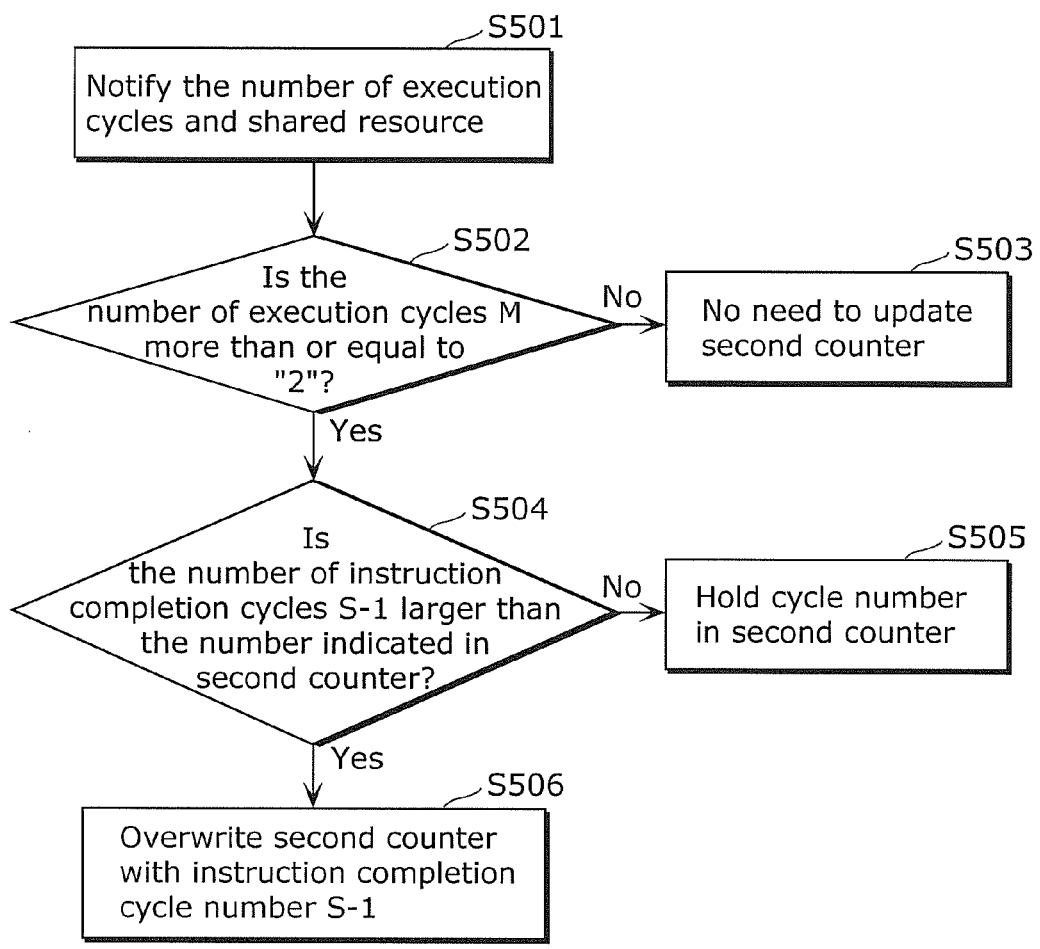
FIG. 4 is a flowchart which shows a flow of processing of rewriting algorithm in a second counter according to Embodiment 1 of the present invention.

FIG. 4 is a flowchart which shows a flow of processing in rewriting algorithm in the second counter 305 according to Embodiment 1 of the present invention.

The resource management unit 210 is notified, from the instruction-issuance controlling unit 204, of the number M of the execution cycles for an instruction to be executed and a shared resource defined by the instruction (Step S501).

Next, the resource management unit 210 determines whether or not the number M of the execution cycles as newly notified is 2 or more (Step S502).

If the number of the execution cycles as newly notified is smaller than 2, the shared resource defined to be used by the instruction can be immediately used after the instruction is executed. Therefore, it is not necessary to manage the shared resource by the second counter 305. Accordingly, the resource management unit 210 does not update the second counter 305 (Step S503).

The number of the execution cycles as newly notified is 2 or more, the shared resource defined to be used by the instruction cannot be used until one or more cycles are completed after the execution of the instruction is initiated. Accordingly, it is necessary for the number of the execution cycles to be managed by the second counter 305.

Here, the number of the execution cycles newly notified is set to S, and the number of an instruction completion cycles is defined as S−1. The resource management unit 210 determines whether or not the number of the instruction completion cycles S−1 is larger than the number of the instruction execution cycles held by the second counter 305 of the corresponding shared resource (Step S504).

If the number of the instruction execution cycles held by the second counter 305 is larger than S−1, the resource management unit 210 holds the existing number of the instruction execution cycles as it is (Step S505).

If S−1 is larger than the number of the instruction execution cycles held by the second counter 305, the resource management unit 210 overwrites the corresponding second counter 305 with the number S−1 of the instruction completion cycles (Step S506).

If the shared resource is previously defined to be used by the instruction, the resource management unit 210 holds, in the second counter 305, the number of the cycles necessary for the instruction until the execution of the instruction which uses the corresponding shared resource is completed, using the aforementioned algorithm, and also manages a fact that the shared resource cannot be used.

Figure 5:
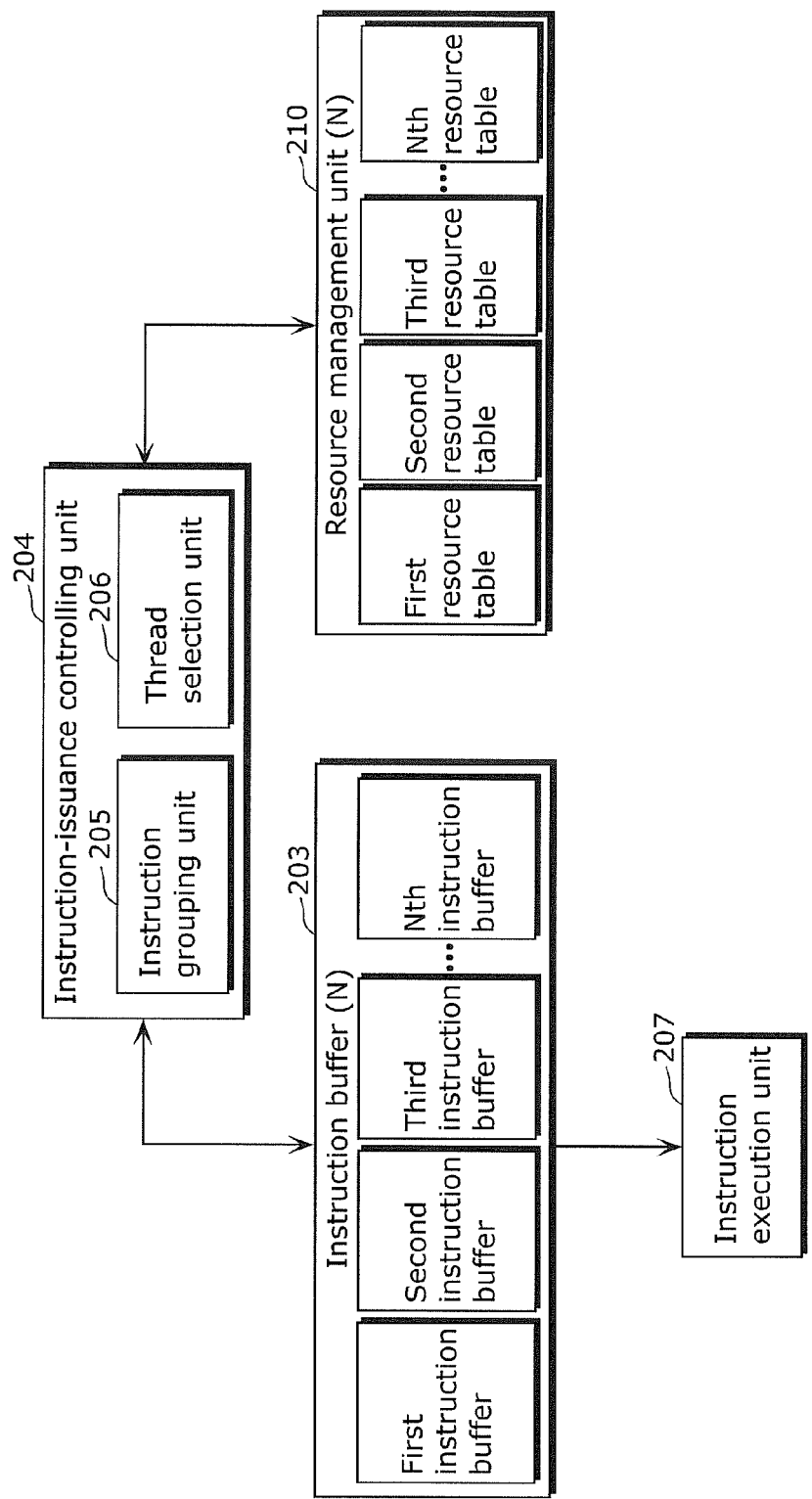
FIG. 5 is a diagram which shows a function of the instruction issuance controlling device according to Embodiment 1 of the present invention.

FIG. 5 is a diagram which shows a function of the instruction-issuance controlling unit 204 according to Embodiment 1 of the present invention.

As described above, the instruction-issuance controlling unit 204 includes the instruction grouping unit 205 and the thread selection unit 206.

Here, the instruction grouping unit 205 has a function of grouping instruction streams stored in the instruction buffer 203 to a group of simultaneously issuable instructions, based on the dependency between an instruction in the second flag holding unit 306 in the resource management unit 210 and an instruction in the instruction buffer 203.

The instruction grouping unit 205 further has a function of detecting the inter-instructions penalty between instructions stored in the instruction buffer 203, and registering, as the thread stalling cycle 321, the penalty cycle in the resource management unit 210.

Figure 6:
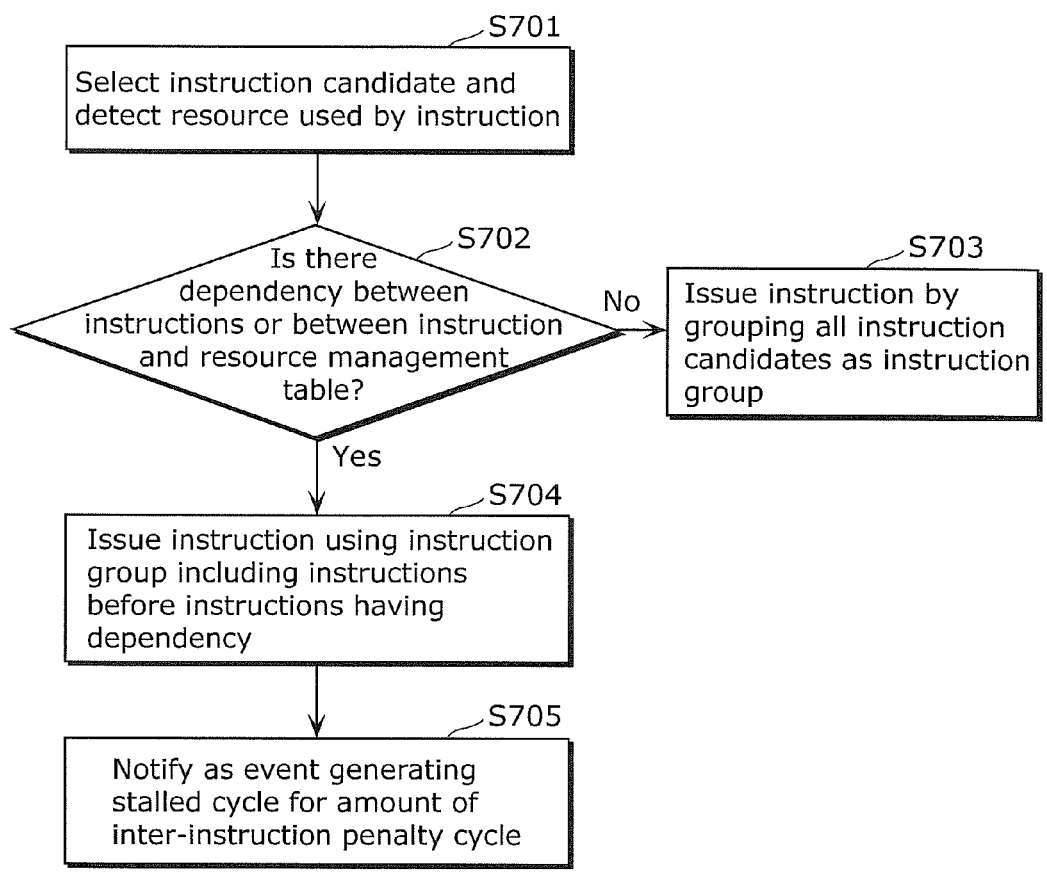
FIG. 6 is a flowchart for describing an algorithm used for grouping instructions by an instruction grouping unit, and for overwriting the first counter, caused by an inter-instructions penalty, according to Embodiment 1 of the present invention.

Next, with reference to FIG. 6, an algorithm is described which is used for selecting an instruction by the instruction grouping unit 205, and for overwriting the thread stalling cycle 321, caused by the inter-instructions penalty.

FIG. 6 is a flowchart for describing the algorithm used for grouping instructions by the instruction grouping unit 205 according to Embodiment 1 of the present invention, and for overwriting the first counter, caused by the inter-instructions penalty.

The instruction grouping unit 205 selects a plurality of instruction candidates which can be simultaneously issued, from among the instruction streams stored in the instruction buffer 203, and detects the shared resource used by each of the instruction candidates (Step S701).

Next, the instruction grouping unit 205 checks whether or not the dependency exists between the selected instruction candidates, or between the shared resource managed by the resource management unit 210 and each of the instruction candidates (Step S702).

If each of the selected instruction candidates does not have the dependency with another one of the instruction candidates and any one of the shared resources managed by the resource management unit 210, the instruction grouping unit 205 groups, as the instruction group, all of the instruction candidates, and performs controlling by sending the control signal to the instruction buffer 203 to issue an instruction (Step S703).

On the other hand, if the dependency exists between instruction candidates or between one of the instruction candidates and the resource management table, the instruction grouping unit 205 performs controlling by grouping and issuing, as the instruction group, instruction candidates before the instruction candidate which has dependency with another instruction candidate which is not included in the instruction candidates to be grouped. (Step S704).

Furthermore, the instruction grouping unit 205 notifies the resource management unit 210 that the thread is to be in the stalled state for an amount of cycles necessary for the inter-instructions penalty caused by the dependency (Step S705).

The notification is processed by the resource management unit 210, using the rewriting algorithm for the first counter 303 shown in FIG. 3.

Next, a function of the thread selection unit 206 is described, again referring to FIGS. 5 and 2.

The thread selection unit 206 obtains a value of the thread ready flag from the first flag holding unit 304 in the resource management unit 210. The thread selection unit 206 allows only a thread in which a value of the thread ready flag is 1, to be a selectable candidate for the thread to be subsequently executed.

The aforementioned control prevents the instruction-issuance controlling unit 204 from selecting and issuing the thread in the stalled state, so that the instruction-issuance controlling unit 204 constantly continues selecting and issuing the thread which is in a ready state, thereby improving the throughput of the multithread processor.

Figure 7:
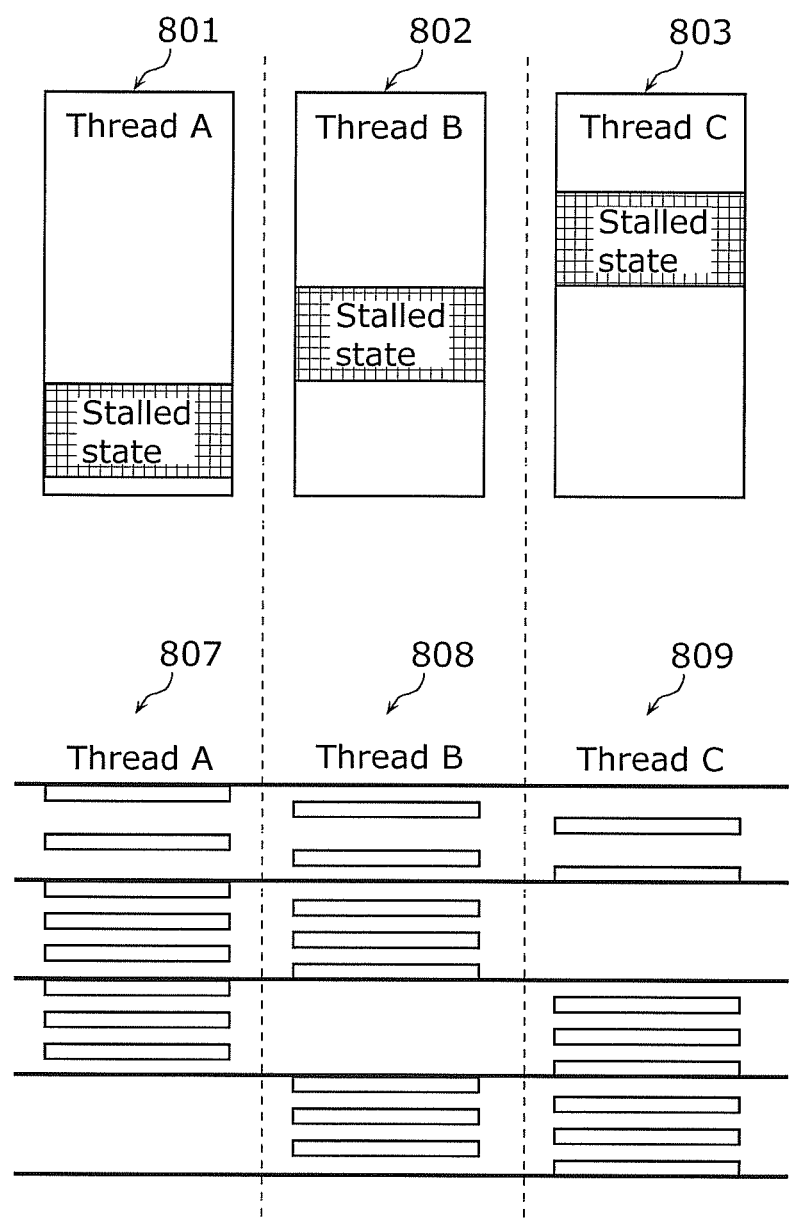
FIG. 7 is a diagram for describing effect according to Embodiment 1 of the present invention.

FIG. 7 is a diagram for describing an effect obtained in Embodiment 1 of the present invention.

Figure 11:
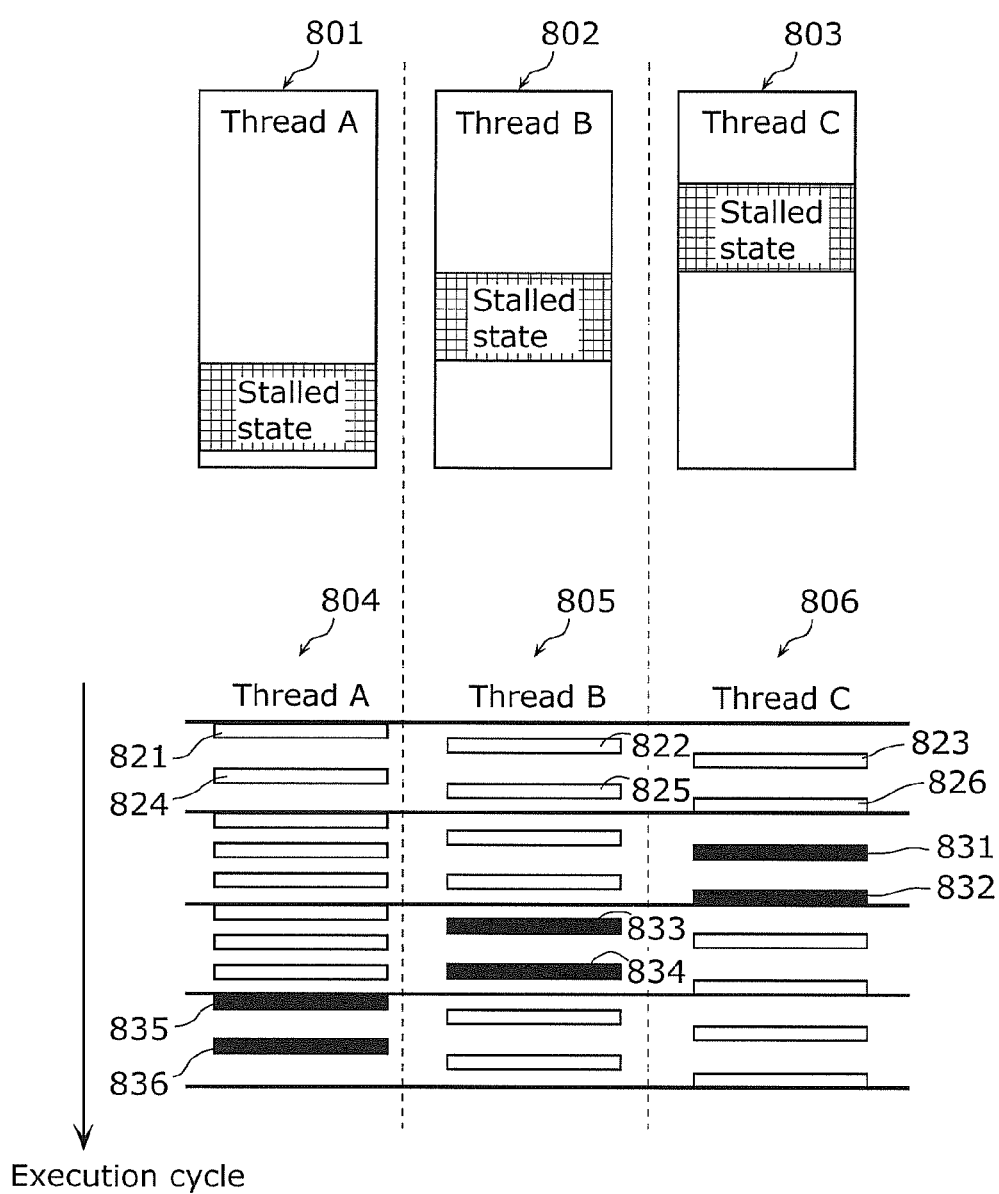
FIG. 11 is a diagram which shows an execution timing of an instruction when a conventional instruction-issuance controlling device is used.
Figure 12:
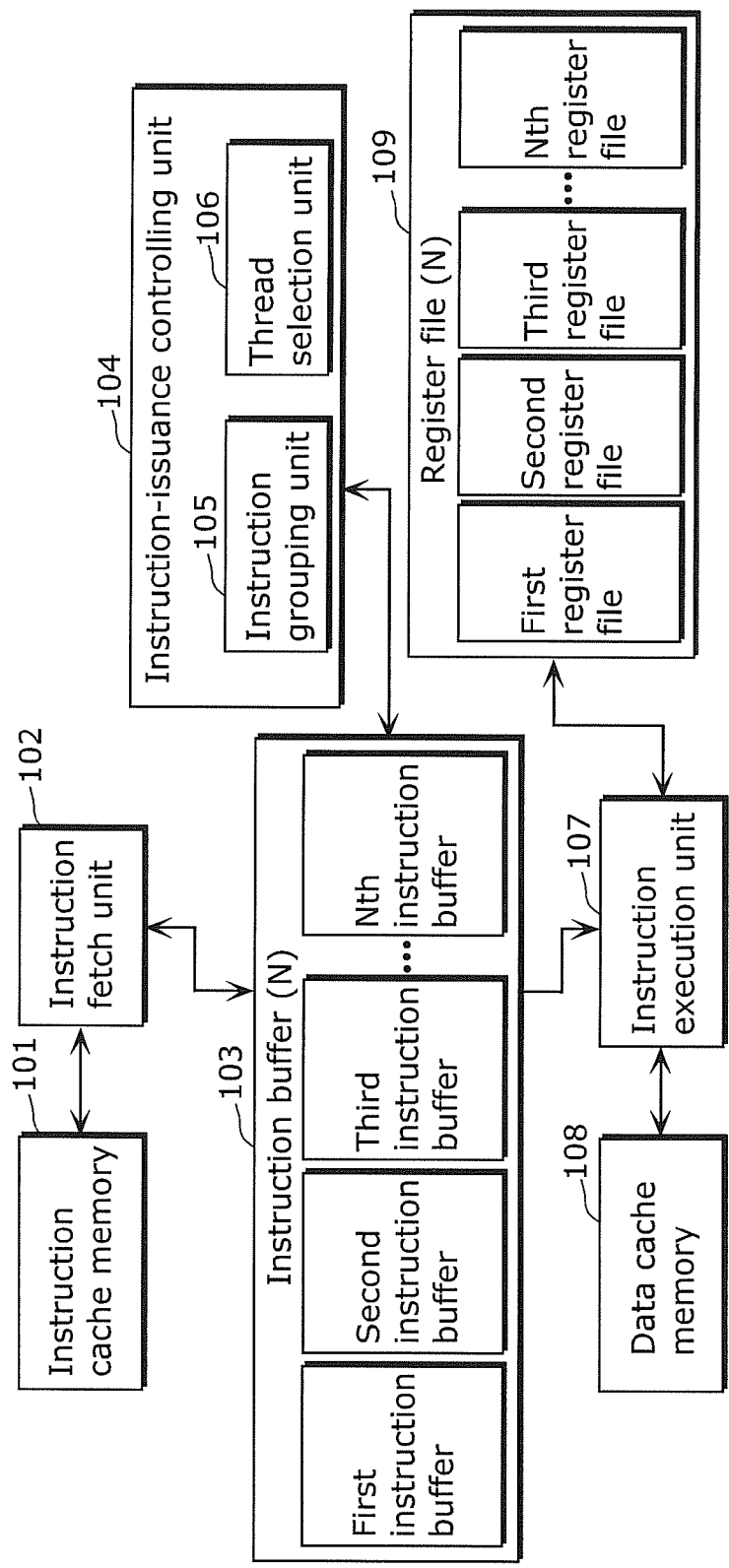
FIG. 12 is a diagram which shows an overall configuration of a multithread processor including a conventional instruction-issuance controlling device.

The same reference is allocated to a component same with that in FIG. 11, and detailed description thereof is omitted.

Each of the thread A801, thread B802, and thread C803 includes therein a zone in which a stalled cycle occurs, as shown in FIG. 7. The respective results of execution of these threads by the multithread processor 100 including the instruction-issuance controlling device 220 according to Embodiment 1 are shown in a time chart 807, a time chart 808, and a time chart 809.

As shown in FIG. 11, two stalled cycles occur in each of the execution result 804 for the thread A, the execution result 805 for the thread B, and the execution result 806 for the thread C, in an existing technique.

The results also indicate that 25% of the total thread execution is in the stalled state.

In contrast, no stalled cycle occurs in the time chart 807 to the time chart 809 which are the results of the execution, of the threads same with those used in processing shown in the FIG. 11, by the multithread processor 100 which includes the instruction-issuance controlling device 220 according to Embodiment 1.

This is because that, if any one of the threads is in the stalled state, the instruction-issuance controlling device 220 does not allow the thread to be the selectable candidate for the issuance.

As a result, in the multithread processor 100 including the instruction-issuance controlling device 220 according to Embodiment 1, a total throughput can be improved by 25% in comparison with the conventional technique.

[Modification]

Next, the instruction-issuance controlling device 220 and the multithread processor 100, according to modification of Embodiment 1, are described.

In the modification, a coping method for a case where a penalty, such as a cache miss, varies depending on an access status in a bus is described.

Figure 8:
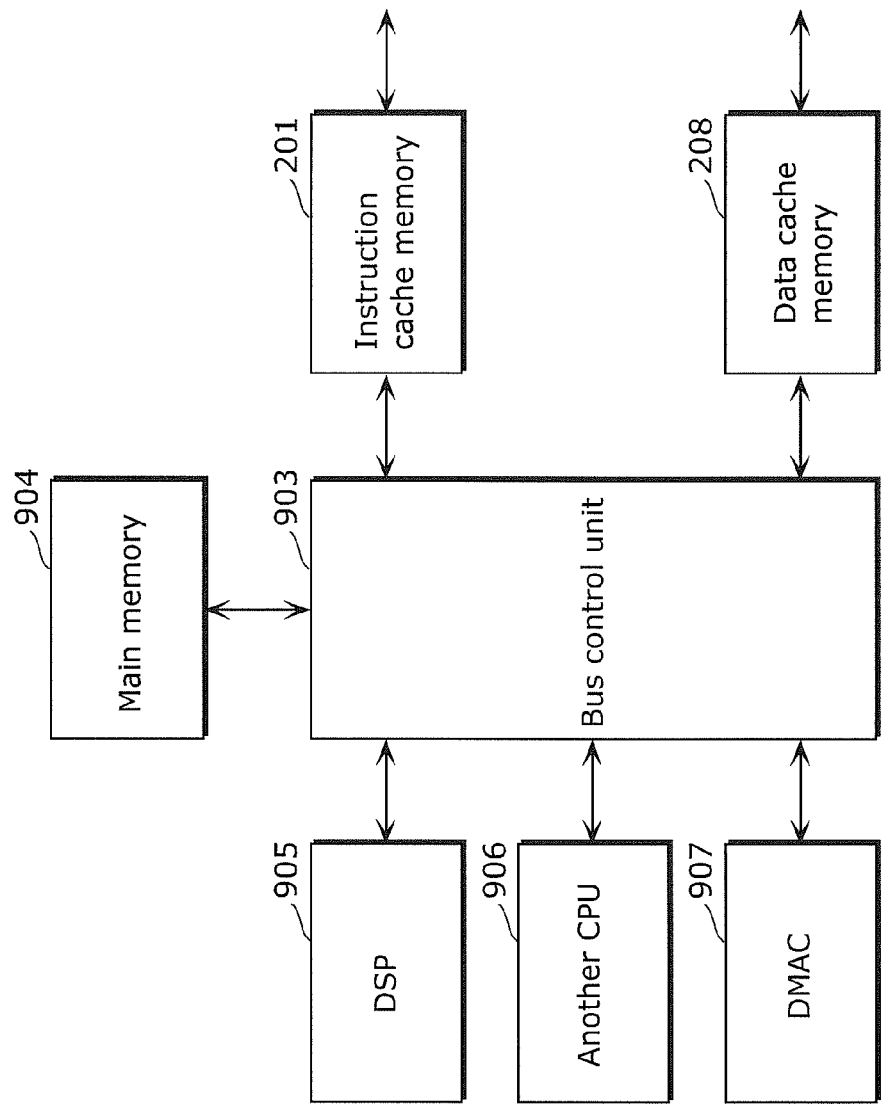
FIG. 8 is a diagram for describing a bus control unit according to modification of Embodiment 1.

FIG. 8 is a diagram for describing a bus controlling unit 903 according to the modification.

As shown in FIG. 8, the bus controlling unit 903 is connected, via a bus, to the instruction cache memory 201, the data cache memory 208, and the main memory 904 outside a processor. The bus controlling unit 903 is further connected to a digital signal processor (DSP) 905, another central processing unit (CPU) 906, and a direct memory access controller (DMAC) 907.

The bus controlling unit 903 is a controller chip which controls a bus. The bus controlling unit 903 forwards an instruction from the main memory 904 to the instruction cache memory 201, and forwards data from the main memory 904 to the data cache memory 208.

The main memory 904 is a storage unit which temporarily reads and holds data and an instruction which is to be executed by the multithread processor 100 using the instruction execution unit 207. The main memory 904 is a random access memory (RAM) or the like.

The DSP 905 is a microprocessor specializing in digital signal processing.

The DMAC 907 is a controller for achieving a direct memory access (DMA) in which data is directly transferred between an input-output device and a memory via the bus, but not via the CPU.

If the cache miss occurs in the instruction cache memory 201 and the data cache memory 208, and the bus controlling unit 903 is already occupied (by a processing device, such as another CPU, DSP, or the like, for example), the bus controlling unit 903 notifies the resource management unit 210 of the number of remaining occupation cycles, which indicates how many cycles are required for continuation of the current occupation.

Next, the resource management unit 210 updates a first counter according to the number of the remaining occupation cycles as notified.

The above is described in more detail.

In Embodiment 1, each of penalty cycles, such as an instruction cache miss and a data cache miss, is supposed as a penalty cycle having a fixed value.

Here, the bus controlling unit 903 may be connected to other components including the DSP 905, another CPU 906, the DMAC 907, and the like, as show in FIG. 8. In such a case, even if a request for forwarding an instruction is sent from the instruction cache memory 201 to the bus controlling unit 903, the forwarding of the instruction is not initiated as long as the other component occupies the bus controlling unit 903.

In other words, the number of the cycles required for the occupation of the bus controlling unit 903 by the other component and the number of cycles required for the forwarding of the instruction from the main memory 904 to the instruction cache memory 201 are written in the first counter 303 of the resource management unit 210, thereby achieving thread control in which the number of the cycles required for the completion of the forwarding of the instruction to the instruction cache memory 201 is practically managed.

As described above, in the multithread processor 100 according to the modification, a time period necessary for the occupation of the bus controlling unit 903 by other components (the DSP 905 and so on) connected to the same bus controlling unit 903 is managed by the resource management unit 210, thereby managing the number of the stalled cycles more precisely. Therefore, the throughput of the multithread processor 100 can be increased.

Embodiment 2

Next, the instruction-issuance controlling device 220 and the multithread processor 300, according to Embodiment 2 are described.

In Embodiment 2, a multithread processor 300 in which the instruction-issuance controlling unit 204 includes a branch predictor, can manage the number of stalled cycles, and increase a throughput.

Figure 9:
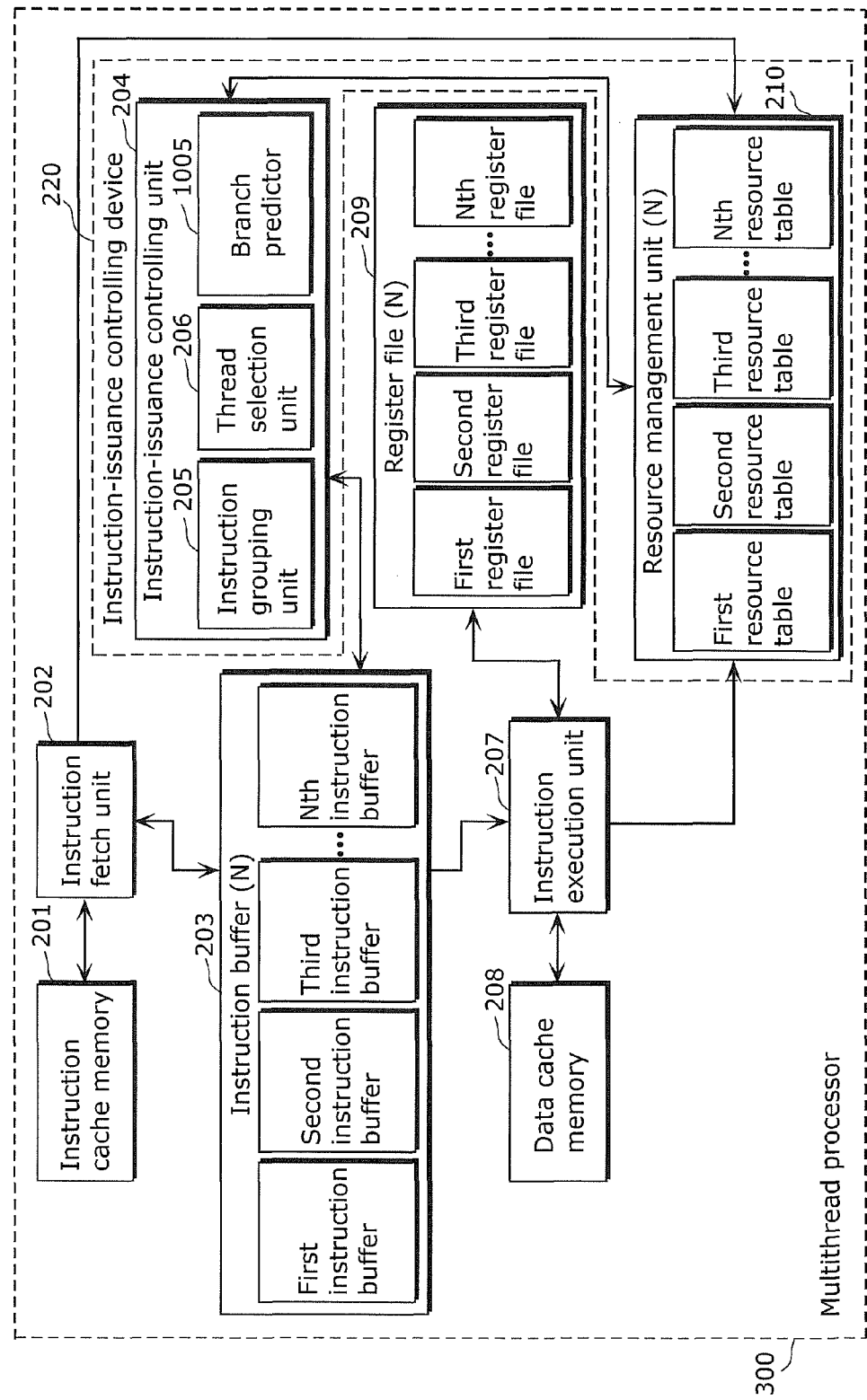
FIG. 9 is a diagram which shows an overall configuration of a multithread processor including a branch predictor according to Embodiment 2 of the present invention.

FIG. 9 is a diagram which shows an overall configuration of the multithread processor 300 including a branch predictor 1005, according to Embodiment 2. It should be noted that the same reference as in FIG. 1 is allocated to a component same with that in FIG. 1, and the detailed description thereof is omitted.

The difference between the multithread processor 300 shown in FIG. 9 and the multithread processor 100 shown in FIG. 1 is the branch predictor 1005 which is added to the instruction-issuance controlling device 220 included in the multithread processor 300 shown in FIG. 9.

In other words, the instruction-issuance controlling unit 204 further includes the branch predictor 1005. The branch predictor 1005 predicts a branch destination address before the instruction execution unit 207 completes execution of a branch instruction, and executes the branch instruction using the predicted address. Along with this, the branch predictor 1005 also notifies the resource management unit 210 of the number of stalled cycles which have possibility to occur due to an incorrectness of the prediction for the branch destination address.

The resource management unit 210 adds the number of stalled cycles as notified to a value indicated by the first counter 303, when the resource management unit 210 receives the notification, from the branch predictor 1005, to the effect that the branch destination address is predicted.

Below is more detailed description.

In general, the execution of the branch instruction causes the penalty cycle to occur before the branch destination address of the branch instruction is fixed. During the penalty cycle, a subsequent instruction cannot be issued. As a result, the instruction execution unit 207 is in the stalled state, so that the execution efficiency decreases.

The branch predictor 1005 includes a mechanism which predicts the branch destination address before the instruction execution unit 207 completes the execution of the branch instruction, so as to hide the penalty cycle in the execution of the branch instruction.

The branch predictor 1005 predicts the branch destination address of the branch instruction when the instruction buffer 203 issues the branch instruction, and speculatively allows the instruction designated to the branch destination address to be fetched and executed.

With this configuration, if the prediction by the branch predictor 1005 is correct, the penalty in the execution of the branch instruction is hidden. However, if the prediction by the branch predictor 1005 is not correct, the branch predictor 1005 is required to cancel the speculatively executed instruction, and to execute the instruction again from a status before the branch prediction.

Accordingly, when the branch prediction by the branch predictor 1005 is not correct, a penalty as much as the execution of the branch instruction occurs.

In order to hide the penalty accompanied with a missprediction, the branch predictor 1005 included in the multithread processor 300 according to the Embodiment 2 notifies the resource management unit 210 of stalled cycles in the thread which have possibility to occur due to the incorrectness of the prediction at the time of the branch prediction.

As described above, it is possible to hide the stalled cycles caused by the penalty accompanied with the branch-prediction miss, by assuming that the thread may be in the stalled state at the time of the branch prediction, and adding the number of cycles having possibility to cause the thread to be in the stalled state, to the first counter 303 included in the resource management unit 210.

With respect to updating of the first counter 303, it is possible to increase the throughput of the multithread processor 300 by appropriately changing an updating algorithm, depending on prediction accuracy of the branch predictor 1005 and a type (normal branch, indirect branch) of the branch instruction.

For example, the branch predictor 1005 may store whether the prediction for the branch instruction is correct or incorrect. If the previous prediction is correct, the branch predictor 1005 may notify the resource management unit 210 of the number of the stalled cycles smaller than that in a previous case where the prediction is incorrect.

If the branch instruction is the normal branch, the branch predictor 1005 may notify the resource management unit 210 of the number of the stalled cycles smaller than that for the indirect branch. In contrast, under the same condition as above, the branch predictor 1005 may notify the resource management unit 210 of the number of the stalled cycles larger than that for the indirect branch.

With the multithread processor 300 which includes the branch predictor 1005 according to the aforementioned Embodiment 2, it is possible to hide the stalled cycles caused by the penalty for the branch-prediction miss, which occurs due to the incorrectness of the branch prediction by the branch predictor 1005.

Embodiment 3

Next, the instruction-issuance controlling device 220 and the multithread processor 400 according to Embodiment 3 are described.

In the multithread processor 400 having a simultaneous multithreading (SMT) function according to Embodiment 3, a throughput is increased by managing the number of the stalled cycles.

Figure 10:
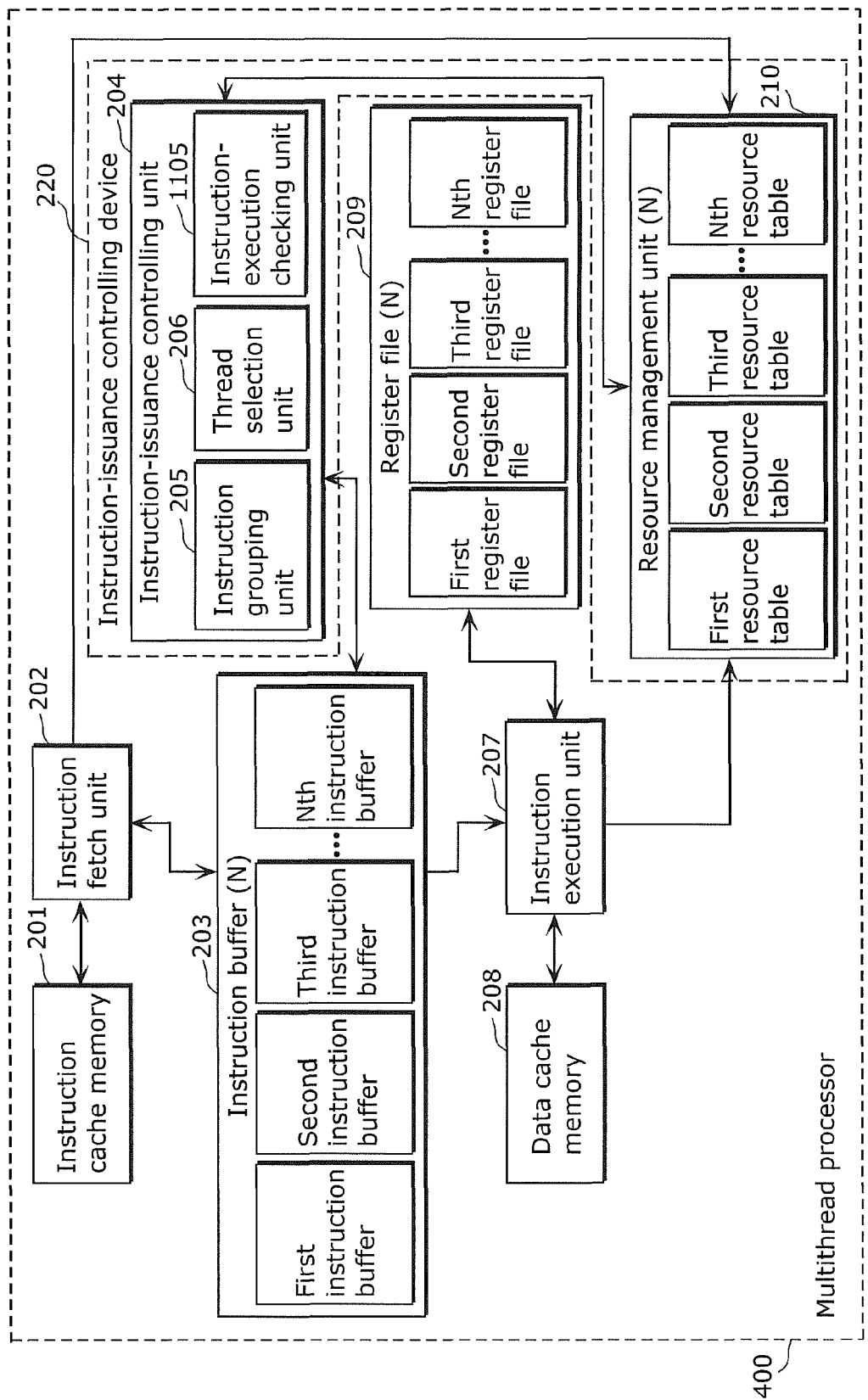
FIG. 10 is a diagram which shows an overall configuration of a multithread processor according to Embodiment 3 of the present invention.

FIG. 10 is a diagram which shows an overall configuration of a multithread processor 400 according to Embodiment 3. It should be noted that the same reference as in FIG. 1 is allocated to a component same with that in FIG. 1, and the detailed description thereof is omitted.

A component newly added in Embodiment 3 is an instruction-execution checking unit 1105.

As described in Embodiment 1, an instruction group including one or more simultaneously executable instructions which are grouped by the instruction grouping unit 205 is issued to the instruction execution unit 207.

Here, instructions grouped by the instruction grouping unit 205 are determined based on a configuration of a calculation unit included in the instruction execution unit 207.

Consideration is given to a more specific case in which the calculation unit included in the instruction execution unit 207 includes two integer calculation units, one memory access unit, and one branch unit.

In this case, even if an instruction stream exists containing three instructions which use the integer calculation units with the highest priority, the instruction grouping unit 205 groups the three instructions as the instruction group including an instruction stream containing two instructions because of only two integer calculation units.

In contrast, when the instruction grouping unit 205 makes a group containing a single instruction which uses the integer calculation unit (depending on dependency between instructions which belong to a single thread), an instruction group which uses a single integer calculation unit is issued irrespective of idleness in the remaining integer calculation unit and other units.

As a result, a processing efficiency of the instruction execution unit 207 decreases.

The multithread processor 400 according to Embodiment 3 solves this problem by providing the instruction-execution checking unit 1105.

Specifically, procedures for determining the threads to be executed from a thread in a ready state in the order according to the priority are performed as follows.

First, the instruction grouping unit 205 groups instructions each of which belongs to a thread having the highest priority.

Next, the instruction-execution checking unit 1105 checks whether or not the vacancy exists in a calculation unit included in the instruction execution unit 207.

If there is the vacancy in the calculation unit, and one or more instructions simultaneously (i.e., in the same cycle) issuable with a previous group among instructions belonging to a thread which has been selected by the thread selection unit 206 as the thread having the next priority, the instruction grouping unit 205 groups the instructions as a new instruction group, and controls to issue the new instruction group to the instruction execution unit 207.

The instruction groups belonging to mutually different threads can be issued in a single issuance cycle by repeating the above operation until (i) the instruction issuance peaks; (ii) the number of the calculation units included in the instruction execution unit 207 peaks; or (iii) threads in the ready state are exhausted.

Although the aforementioned technique is typically known as the SMT, the thread selection unit 206 selects a thread in view of the thread ready flag in the first flag holding unit 304 included in the resource management unit 210 in Embodiment 3.

Furthermore, the instruction grouping unit 205 distinguishingly groups instructions, in view of the resource ready flag in the second flag holding unit 306 included in the resource management unit 210.

Specifically, in the SMT multithread processor 400 which is capable of issuing a plurality of instruction groups to the instruction execution unit 207 in a single cycle operation, and includes the instruction-issuance controlling device 220, the instruction-issuance controlling device 220 includes the resource management unit 210 for managing stall information indicating whether or not each of the threads in execution is in the stalled state, the thread selection unit 206 for selecting a thread which is not in the stalled state among the threads in execution, and the instruction grouping unit 205 for performing controlling so as to simultaneously issue, to the instruction execution unit 207, a plurality of instruction groups each of which belongs to a corresponding one of the selected threads.

With this configuration, in the SMT multithread processor 400, the thread to be in the stalled state can be removed from an execution target by managing the stalled cycle, thereby increasing the throughput of the multithread processor 400.

It should be noted that each of the processing units included in the instruction-issuance controlling devices and the multithread processors according to the aforementioned Embodiments 1 to 3 is typically achieved as a large scale integration (LSI) which is an integrated circuit. Each of these units may individually be prepared as a single chip, or a part of or all of these units may be made in a single chip.

The LSI is taken as an example. The LSI may be called as an integrated circuit (IC), a system large scale integration (system LSI), a super large scale integration (super LSI), or an ultra large scale integration (ultra LSI), depending on the integration degrees.

The integrated circuit is not limited to the LSI, but may be achieved by a dedicated communication circuit or a general-purpose processor. A field programmable gate array (FPGA) which can be programmed after producing the LSI or a reconfigurable processor in which connection or setting of a circuit cell inside the LSI is reconfigurable may be used.

If technique of creating the integrated circuit instead of the LSI appears by progress in semiconductor technology or by derived other techniques, it is natural to create integration of each of the processing units using the techniques. Application of biotechnology can be considered as a possibility.

A part of or all of functions of the instruction-issuance controlling devices and the multithread processors according to Embodiments 1 to 3 may be achieved in such a manner that a processor, such as a CPU, executes the program.

Furthermore, the present invention may be achieved as the aforementioned program, or a recording medium in which the above program is recorded. It is needless to say that the program can be distributed via a transmitting medium, such as the Internet.

At least a part of functions of the instruction-issuance controlling devices and the multithread processors according to Embodiments 1 to 3 may be combined with each other.

All reference numerals in the above are used as examples for specifically describing the present invention, and the present invention is not limited by the exemplified reference numerals.

Connection relationship between components are used as examples for specifically describing the present invention, and the connection relationship which is used for achieving the functions of the present invention is not limited to the examples.

The aforementioned embodiments are achieved using hardware and/or software. The configuration using hardware can be achieved using software, while the configuration using software can be achieved using hardware.

Various modifications made by varying Embodiments 1 to 3 according to the present invention within a range conceivable by a person skilled in the art are included in the present invention, unless the principle of the present invention is not departed.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is a technique which relates to an essential part of architecture in relation to thread-issuance control by a processor, and is also a technique which can provide a processor with a high execution performance. According to the present invention, the thread-issuance control with a high execution efficiency can be achieved by a simple hardware.

Therefore, the present invention is a usable technique in any one of an embedded field, a general purpose PC field, and a super computing field.

The invention claimed is:

1. An instruction-issuance controlling device included in a multithread processor, the device comprising:
   a resource management unit configured to manage stall information indicating whether or not each of threads in execution is in a stalled state;
   a thread selection unit configured to select a thread which is not in the stalled state among the threads in execution; and
   an instruction-issuance controlling unit configured to control the multithread processor so that simultaneously issuable instructions are issued from the selected thread,
   wherein the resource management unit is configured to, for each of the threads in execution, (i) manage the number of stalled cycles which indicates the number of remaining cycles for the stalled state to determine whether or not the number of the stalled cycles is one or more, and (ii) determine that the thread is not in the stalled state and update the stall information if the number of the stalled cycles is 0.

2. A multithread processor comprising:
   an instruction execution unit; and
   an instruction-issuance controlling device,
   wherein the instruction-issuance controlling device includes:
   a resource management unit configured to manage stall information indicating whether or not each of threads in execution is in a stalled state;
   a thread selection unit configured to select a thread which is not in the stalled state among the threads in execution; and
   an instruction-issuance controlling unit configured to perform controlling so that simultaneously issuable instructions are issued from the selected thread to the instruction execution unit,
   wherein the resource management unit is configured to, for each of the threads in execution, (i) manage the number of stalled cycles which indicates the number of remaining cycles for the stalled state to determine whether or not the number of the stalled cycles is one or more, and (ii) determine that the thread is not in the stalled state and update the stall information if the number of the stalled cycles is 0.

3. The multithread processor according to claim 2, wherein the resource management unit includes:
   a first flag holding unit configured to hold a thread ready flag as the stall information; and
   a first counter for managing the number of the stalled cycles, and
   the resource management unit is configured to (i) set the thread ready flag to 0, if the first counter indicates 1 or more, and (ii) set the thread ready flag to 1, if the first counter indicates 0.

4. The multithread processor according to claim 3, further comprising
   a plurality of instruction buffers, each of which stores instructions in each of the threads,
   wherein the instruction-issuance controlling unit includes an instruction grouping unit configured to group, as an instruction group, one or more simultaneously issuable instructions to be subsequently issued to the instruction execution unit, among the instructions stored in the instruction buffers, and
   the instruction grouping unit is configured to perform the grouping so as to preferentially include, in the instruction group, an instruction which has no dependency with each of the instructions currently executed by the instruction execution unit, among the instructions stored in the instruction buffers.

5. The multithread processor according to claim 4, wherein the resource management unit includes:
   a second flag holding unit configured to hold resource ready flags each of which is associated with a corresponding one of shared resources and indicates whether or not the corresponding one of the shared resources is currently occupied by one of the threads in execution; and
   second counters, each of which indicates the number of remaining cycles for the occupation of a shared resource included in the shared resources, by one of the thread in execution, and
   the instruction grouping unit is configured to perform the grouping so as not to include, in the instruction group, an instruction using the shared resource currently occupied, among the instructions stored in the instruction buffers.

6. The multithread processor according to claim 5, wherein the instruction grouping unit is configured to notify the resource management unit of identification information in relation to the currently-occupied shared resource and identification information in relation to the thread which occupies the shared resource, and
   the resource management unit is configured to update the first counter for the thread corresponding to the identification information as notified, according to the second counter corresponding to the shared resource as notified.

7. The multithread processor according to claim 4, wherein when each of the instructions stored in the instruction buffers has the dependency with one of the instructions which are being executed by the instruction execution unit, the instruction grouping unit is configured to notify the resource management unit of identification information in relation to the thread in execution to which the instruction stored in the instruction buffers belongs, and the number of remaining execution cycles for completion of the instruction which is being in execution; and the resource management unit is configured to update the first counter for the thread corresponding to the identification information, according to the number of the remaining execution cycles as notified.

8. The multithread processor according to claim 4, further comprising
a data cache memory which holds data to be used by the instruction execution unit,
wherein when a data cache miss occurs, the instruction execution unit is configured to notify the resource management unit of identification information in relation to the thread in execution and the number of cycles required for forwarding data in which the data cache miss has occurred, from a main memory outside the multithread processor to the data cache memory, and
the resource management unit is configured to update the first counter for the thread corresponding to the identification information, according to the number of the cycles as notified.

9. The multithread processor according to claim 4, further comprising:
an instruction cache memory; and
an instruction fetch unit configured to fetch an instruction from the instruction cache memory, and supply the fetched instruction to each of the instruction buffers,
wherein when an instruction cache miss occurs upon the fetch of the instruction, the instruction fetch unit is configured to notify the resource management unit of identification information in relation to the thread in execution and the number of cycles required for forwarding an instruction in which the instruction cache miss occurs, from a main memory outside the multithread processor to the instruction cache memory, and
the resource management unit is configured to update the first counter for the thread corresponding to the identification information, according to the number of the cycles as notified.

10. The multithread processor according to claim 4,
wherein upon execution of a branch instruction, the instruction execution unit is configured to notify the resource management unit of the number of remaining cycles required for fixation of a branch destination address of the branch instruction, and the identification information in relation to the thread to which the branch instruction belongs, and
the resource management unit is configured to update the first counter for the thread corresponding to the identification information, according to the number of the cycles as notified.

11. The multithread processor according to claim 8, further comprising
a bus control unit connected to the instruction cache memory, the data cache memory, and a main memory outside the multithread processor,
wherein when a cache miss occurs in the instruction cache memory and the data cache memory, and the bus control unit is occupied,
the bus control unit is configured to notify the resource management unit of the number of remaining occupation cycles which indicates the number of remaining cycles required for current occupation; and
the resource management unit is configured to update the first counter, according to the number of the remaining occupation cycles as notified.

12. The multithread processor according to claim 6,
wherein the resource management unit is configured to, for each of the threads in execution, overwrite a value indicated by the first counter with the number of the stalled cycles as notified, only when notified of the number of the stalled cycles larger than the value indicated by the first counter.

13. The multithread processor according to claim 5,
wherein the resource management unit is configured to subtract a previously-specified value from a value indicated by the first counter and the second counter at every cycle of operation of the multithread processor.

14. The multithread processor according to claim 3,
wherein the instruction-issuance controlling unit further includes a branch predictor configured to (i) predict a branch destination address before the instruction execution unit completes execution of a branch instruction; (ii) execute the branch instruction using the predicted branch destination address; and (iii) notify the resource management unit of the number of the stalled cycles which have a possibility of occurring due to incorrectness of the prediction for the branch destination address, and
the resource management unit is configured to add the number of the stalled cycles to a value indicated by the first counter, when notified by the branch predictor.

15. A simultaneous multithreading (SMT) multithread processor by which a plurality of instruction groups are simultaneously issued to an instruction execution unit, the SMT multithread processor comprising
an instruction-issuance controlling device including:
a resource management unit configured to manage stall information indicating whether or not each of threads in execution is in a stalled state;
a thread selection unit configured to select threads which are not in the stalled state from among the threads in execution; and
an instruction grouping unit configured to perform controlling so that a plurality of instruction groups, each of which belongs to a corresponding one of the selected threads, are simultaneously issued to the instruction execution unit,
wherein the resource management unit is configured to, for each of the threads in execution, (i) manage the number of stalled cycles which indicates the number of remaining cycles for the stalled state to determine whether or not the number of the stalled cycles is one or more, and (ii) determine that the thread is not in the stalled state and update the stall information if the number of the stalled cycles is 0.

16. An instruction-issuance controlling method for use in a multithread processor, comprising:
managing stall information indicating whether or not each of threads in execution is in a stalled state;
selecting a thread which is not in the stalled state from among the threads in execution; and
performing controlling so that simultaneously issuable instructions are issued from among the selected thread,
wherein the managing stall information comprises, for each of the threads in execution, (i) managing the number of stalled cycles which indicates the number of remaining cycles for the stalled state to determine whether or not the number of the stalled cycles is one or more, (ii) and determining that the thread is not in the stalled state and updating the stall information if the number of the stalled cycles is 0.

* * * * *

UNITED STATES PATENT AND TRADEMARK OFFICE
CERTIFICATE OF CORRECTION

| | |
|---|---|
| PATENT NO. | : 9,436,464 B2 |
| APPLICATION NO. | : 13/692141 |
| DATED | : September 6, 2016 |
| INVENTOR(S) | : Tomohiro Yamana |

It is certified that error appears in the above-identified patent and that said Letters Patent is hereby corrected as shown below:

On the Title Page
In Item (73), "SOCIONECT INC., Kanagawa (JP)" should read --SOCIONEXT INC., Kanagawa (JP)--.

Signed and Sealed this
Twenty-fourth Day of January, 2017

Michelle K. Lee
*Director of the United States Patent and Trademark Office*